(12) United States Patent
Saruwatari

(10) Patent No.: US 6,950,247 B2
(45) Date of Patent: Sep. 27, 2005

(54) ZOOM LENS AND IMAGE PICKUP APPARATUS

(75) Inventor: Hiroshi Saruwatari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/209,683

(22) Filed: Jul. 31, 2002

(65) Prior Publication Data

US 2003/0063395 A1 Apr. 3, 2003

(30) Foreign Application Priority Data

Aug. 3, 2001 (JP) .................................. 2001-236282

(51) Int. Cl.$^7$ ............................. G02B 9/34; G02B 15/14
(52) U.S. Cl. ...................... 359/774; 359/686; 359/687; 359/772; 359/771
(58) Field of Search ............................. 359/687, 684, 359/686, 683, 676, 685, 774, 772, 771, 769, 764, 763

(56) References Cited

U.S. PATENT DOCUMENTS

| | | | |
|---|---|---|---|
| 543,710 A | 7/1895 | Tate | 209/419 |
| 4,299,452 A | 11/1981 | Ikemori | 359/681 |
| 4,370,031 A | 1/1983 | Ikemori | 359/681 |
| 4,634,236 A | 1/1987 | Masumoto | 359/684 |
| 5,283,639 A | 2/1994 | Esch et al. | 348/6 |
| 5,568,321 A * | 10/1996 | Ogawa et al. | 359/676 |
| 5,570,233 A | 10/1996 | Mihara et al. | 359/687 |
| 5,701,204 A * | 12/1997 | Matsumoto | 359/684 |
| 6,104,548 A | 8/2000 | Nakayama et al. | 359/690 |
| 6,353,505 B1 * | 3/2002 | Yoneyama | 359/687 |
| 6,437,923 B1 * | 8/2002 | Yamada | 359/687 |
| 6,462,886 B1 | 10/2002 | Hagimori | 359/687 |
| 6,545,714 B1 * | 4/2003 | Takada | 348/340 |
| 6,580,565 B2 | 6/2003 | Ozaki | 359/687 |
| 6,633,437 B1 | 10/2003 | Hoshi et al. | 359/687 |

FOREIGN PATENT DOCUMENTS

| | | |
|---|---|---|
| JP | 53-132360 | 11/1978 |
| JP | 56-19022 | 2/1981 |
| JP | 57-5012 | 1/1982 |
| JP | 63-34505 | 2/1988 |
| JP | 6-27377 | 2/1994 |
| JP | 7-52256 | 2/1995 |
| JP | 11-125770 A | 5/1999 |
| JP | 2000-347102 | 12/2000 |
| JP | 2001-42215 | 2/2001 |
| JP | 2001-188170 | 7/2001 |
| JP | 2001-350092 | 12/2001 |
| JP | 2002-6216 | 1/2002 |
| JP | 2002-196241 | 7/2002 |

OTHER PUBLICATIONS

Japanese Office Action with English Translation mailed Aug. 24, 2004.
Japanese Office Action with English Translation mailed May 25, 2004.

* cited by examiner

*Primary Examiner*—Georgia Epps
*Assistant Examiner*—Tim Thompson
(74) *Attorney, Agent, or Firm*—Morgan & Finnegan, LLP

(57) ABSTRACT

A zoom lens of a novel configuration suitable for a collapsible lens barrel is disclosed. More specifically, here is disclosed a zoom lens, comprising four lens units which are, in the order from an object side toward an image side, positive, negative, positive and positive in optical power, and performing zooming by varying distances between each lens units. In this zoom lens, the fourth lens unit has a positive lens element and a negative lens element, and satisfies the following conditional expression:

$$\nu n - \nu p$$

where $\nu n$ is the Abbe number of the negative lens element of the fourth lens unit, and $\nu p$ is the Abbe number of the positive lens element of the fourth lens unit.

8 Claims, 7 Drawing Sheets

(W)

(M)

(T)

(W)

(M)

(T)

ZOOM LENS AND IMAGE PICKUP APPARATUS

BACKGROUND OF THE INVENTION

1. Field of the Invention

The present invention relates to a zoom lens, and more particularly to a zoom lens suitable for an image pickup apparatus using a solid image pickup element as a image pickup device, such as a video camera or a digital camera.

2. Description of the Related Art

According to the prior art, zoom lenses of the so-called negative lead type, in which the front-most lens unit has negative optical power (optical power is reciprocal of the focal length), are used as standard zoom lenses for many cameras because of their relative ease in widening the field angle.

As a standard zoom lens of this kind, there is proposed in, for instance, the Japanese Patent Laid-Open No. 53-132360 (corresponding to the U.S. Pat. No. 4,299,452), the Japanese Patent Laid-Open No. 56-19022 (corresponding to the U.S. Pat. No. 4,370,031) and the U.S. Pat. No. 5,283,639, a so-called two-unit zoom lens which consists of two lens units including a first lens unit having negative optical power and a second lens unit having positive optical power, and varies the magnification by moving these two lens units along the optical axis and thereby varying the distance between the lens units.

Further in the Japanese Patent Laid-Open No. 7-52256, there is proposed a zoom lens which has three lens units including, in the order from the object side, a first lens unit having negative optical power, a second lens unit having positive optical power and a third lens unit having positive optical power, and varies the magnification from the wide angle end toward the telephoto end by increasing the distance between the second and third lens units.

Also in the U.S. Pat. No. 543,710, there is proposed a zoom lens which has three lens units including, in the order from the object side toward the lens, a first lens unit having negative optical power, a second lens unit having positive optical power and a third lens unit having positive optical power, and varies the magnification from the wide angle end toward the telephoto end by decreasing the distance between the second and third lens units.

Further, in the Japanese Patent Laid-Open No. 6-27377 (corresponding to the U.S. Pat. No. 6,104,548), there is proposed a multi-unit zoom lens comprising three or more lens units.

In these zoom lenses, where a lens unit having a positive optical power is to be composed of a plurality of lenses, usually a glass material having a greater Abbe number for positive lenses and a glass material having a smaller Abbe number for negative lenses are used. This is a desirable choice of glass materials for suppressing variations in chromatic aberration resulting from zooming or focusing. However, as seen in the Japanese Patent Laid-Open No. 63-34505, there is also proposed a method by which glass materials for fixed lens units are selected conversely to the above-mentioned to reduce the residual component of chromatic aberrations occurring in the zoom section.

Generally, zoom lenses of a negative lead form are characterized by the relative ease of widening the field angle and achieving predetermined back focus.

However, in order to achieve satisfactory optical performance over the whole range of magnifications and over the whole picture frame, it is necessary to appropriately set the optical power distribution and lens shapes of each lens unit.

If the optical power distribution and lens composition of each lens unit are inappropriate, the variation of aberration along with zooming will increase, making it difficult to achieve a high level of optical performance over the full magnification range.

Especially in a two-unit zoom lens in which a lens unit having negative optical power is in the leading position, the relative positions of the constituent lens units on the optical axis are uniquely determined by the zooming and the compensations for variations in the image position. As a result, it is impossible to control as desired the optical performance on the way of zooming from the wide angle end to the telephoto end.

Therefore, in order to improve the optical performance on the way of zooming, it is necessary to minimize the aberration variations of each lens unit in the process of zooming. This is accomplished by, for instance, by easing the optical power of each lens unit or increasing the number of lenses constituting each lens unit. However, these solutions involve the problem of increasing the overall lens length, making it difficult to increase the magnification and enhance the performance.

In order to solve these problems, there is proposed in the U.S. Pat. No. 5,570,233, a zoom lens which consists of, in the order from the object side, a first lens unit having positive optical power, a second lens unit having negative optical power, a third lens unit having positive optical power and a fourth lens unit having positive optical power, and varies the magnification by moving each lens unit. However, along with the development of image pickup devices, in the field of video cameras and digital cameras and the like of which further performance improvement is required, even greater enhancement of optical performance is called for.

Also, a zoom type proposed in the Japanese Patent Laid-Open No. 63-34505, which performing zooming with the lens unit on the object side and forms an image with the relay lens unit on the image side, is unsuitable for the shape of a camera which is provided with a barrel collapsing mechanism to shorten the overall length.

SUMMARY OF THE INVENTION

An object of the present invention, attempted in view of these examples of the prior art, is to provide a zoom lens of a novel configuration suitable for a collapsible lens barrel.

In order to achieve the object stated above, a zoom lens according to the invention is provided with, in the order from the object side toward the image side, a first lens unit having positive optical power, a second lens unit having negative optical power, a third lens unit having positive optical power and a fourth lens unit having positive optical power, and performs zooming by varying the distances between each lens units.

In the zoom lens according to the invention, the fourth lens unit further has a positive lens element and a negative lens element, and satisfies the following conditional expression:

$$1 < \nu n - \nu p < 30$$

where $\nu n$ is the Abbe number of the negative lens element of the fourth lens unit, and $\nu p$ is the Abbe number of the positive lens element of the fourth lens unit.

A detailed configuration of the zoom lens and image pickup apparatus of the invention, the above and other objects and features of the invention will be apparent from the embodiments, described below.

DETAILED DESCRIPTION OF THE PREFERRED EMBODIMENTS

Hereinafter, preferred embodiments of the present invention will be described below in detail with reference to drawings.

Figure 1:
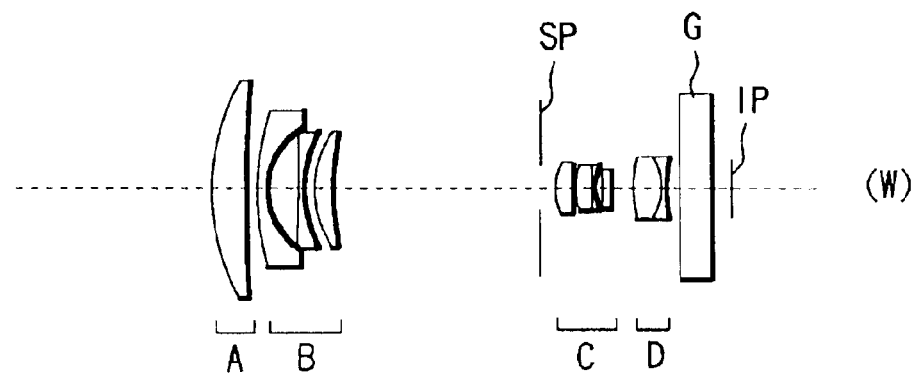
FIG. 1 shows a cross section of lenses in the zoom lens of an embodiment (Numerical Example 1) of the present invention.
Figure 1:
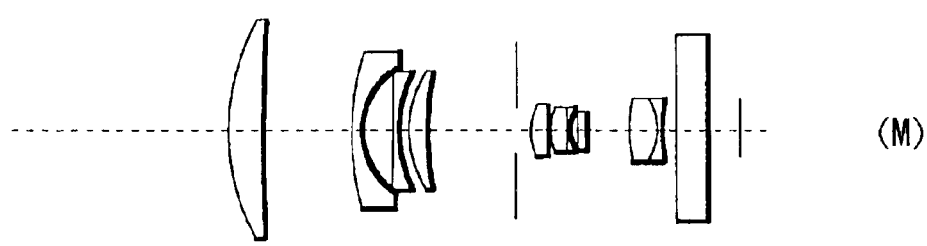
Figure 1:
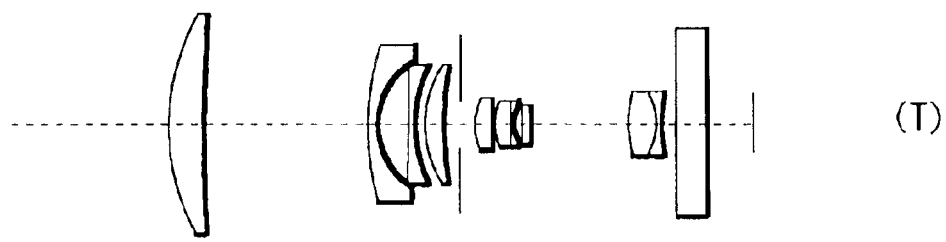
Figure 3:
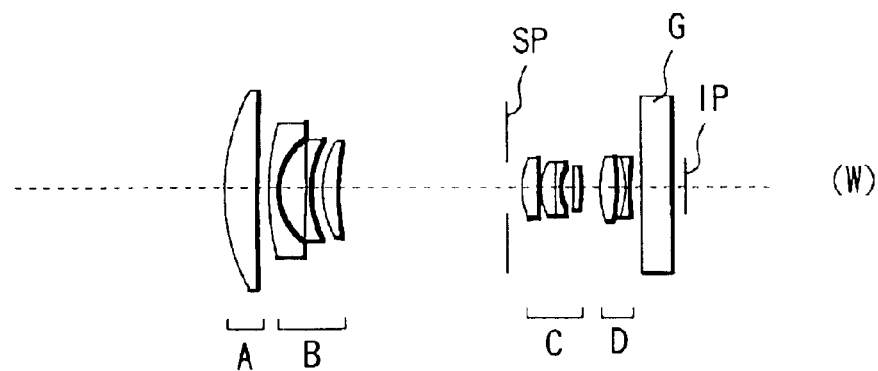
FIG. 3 shows a cross section of lenses in the zoom lens of another embodiment (Numerical Example 2) of the invention.
Figure 3:
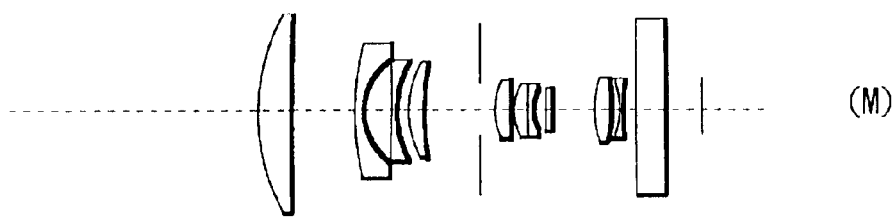
Figure 3:
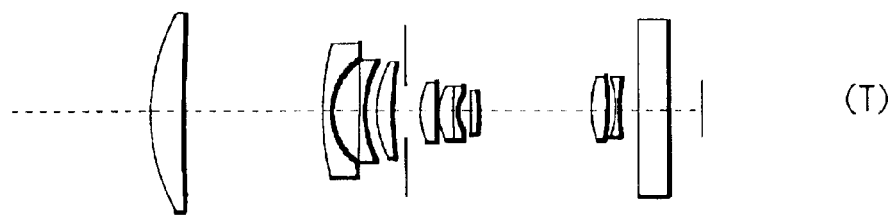
Figure 5:
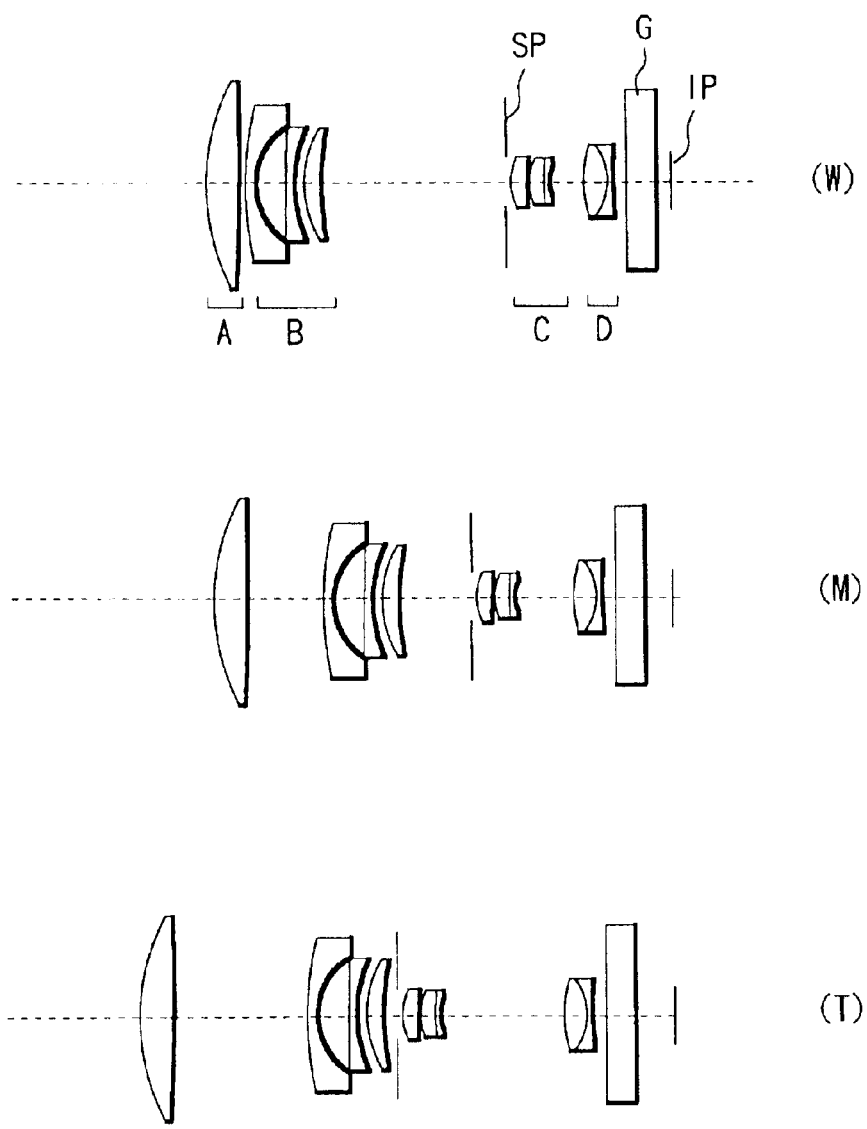
FIG. 5 shows a section of lenses in the zoom lens of still another preferred embodiment (Numerical Example 3) of the invention.

FIG. 1, FIG. 3 and FIG. 5 show cross sections of lenses in the zoom lens of the embodiments corresponding to the Numerical Examples 1–3 described below, respectively.

Each of zoom lenses of the present embodiments is provided for forming an image of the subject on a solid-state image pickup element such as CCD or MOS.

In the sectional views of lenses shown in FIGS. 1, 3 and 5, reference sign (W) denotes the wide angle end; (M), a middle zooming position; and (T), the telephoto end. In each sectional view, reference sign A denotes a first lens unit having positive optical power; B, a second lens unit having negative optical power; C, a third lens unit having positive optical power; and D, a fourth lens unit having positive optical power. Reference sign SP denotes an aperture-stop; IP, the imaging surface of a solid image pickup element or the like; and G, the glass block of a filter, face plate or the like.

Figure 2:
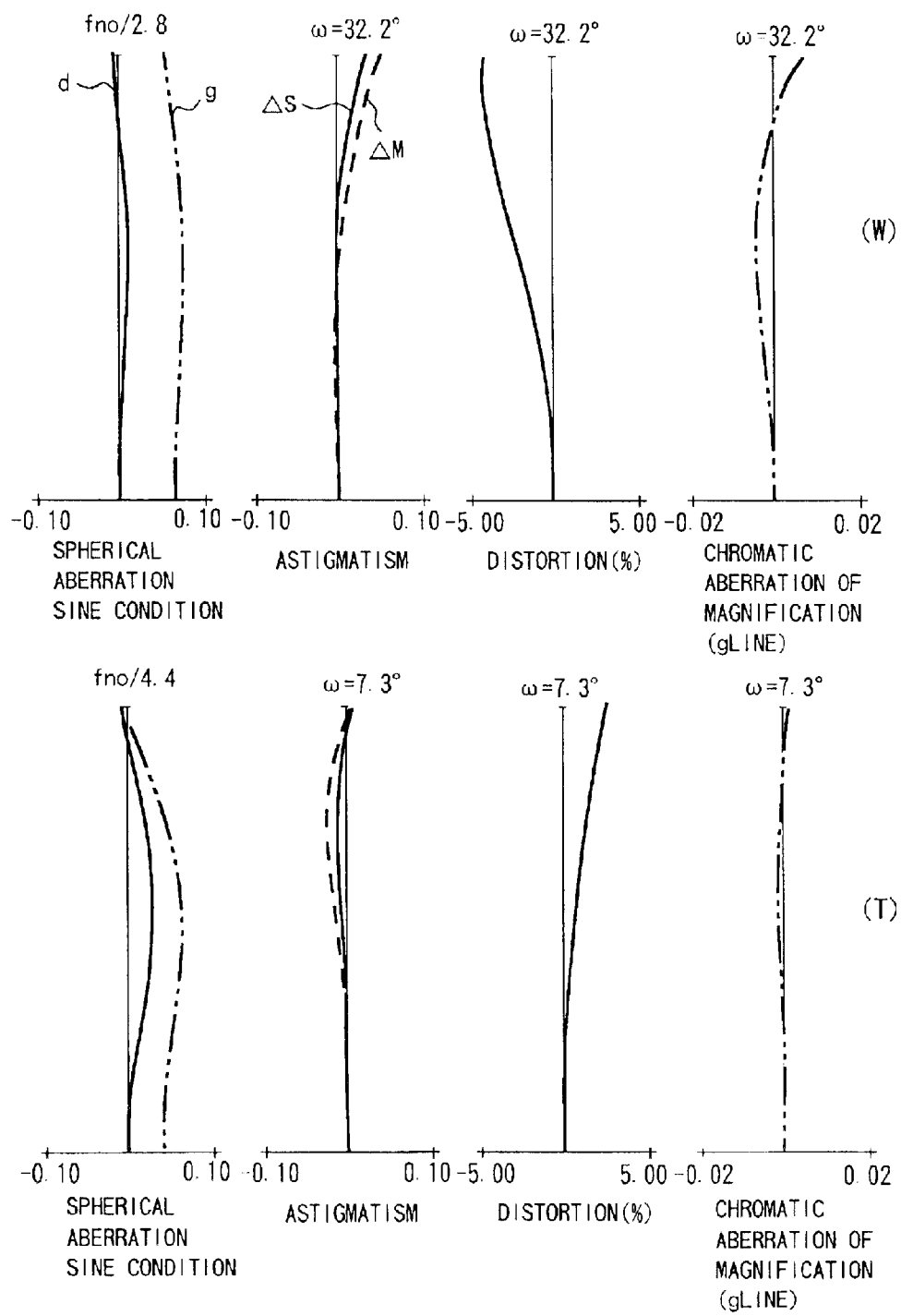
FIG. 2 shows various aberrations of the zoom lens of FIG. 1.
Figure 4:
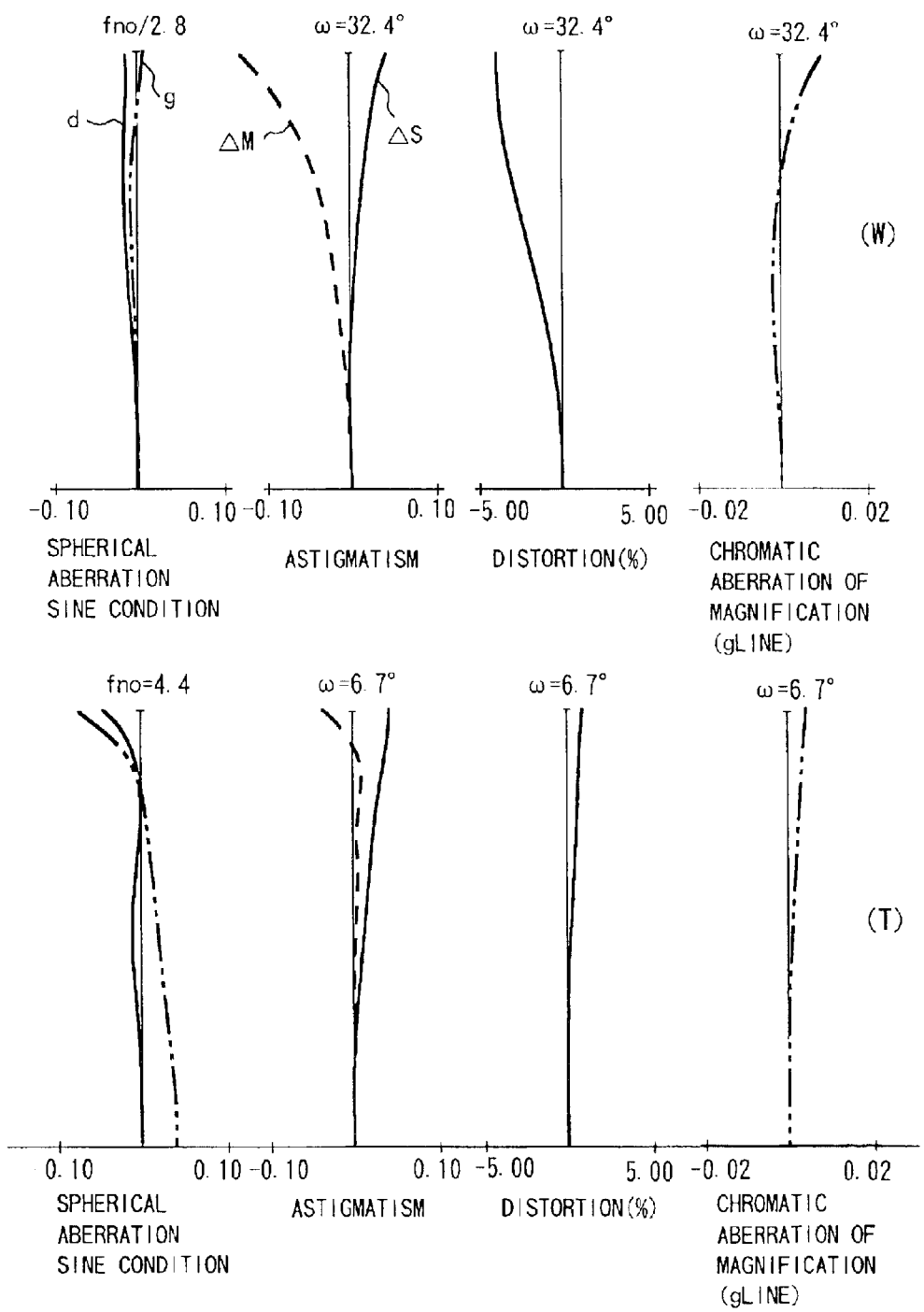
FIG. 4 shows various aberrations of the zoom lens of FIG. 3.
Figure 6:
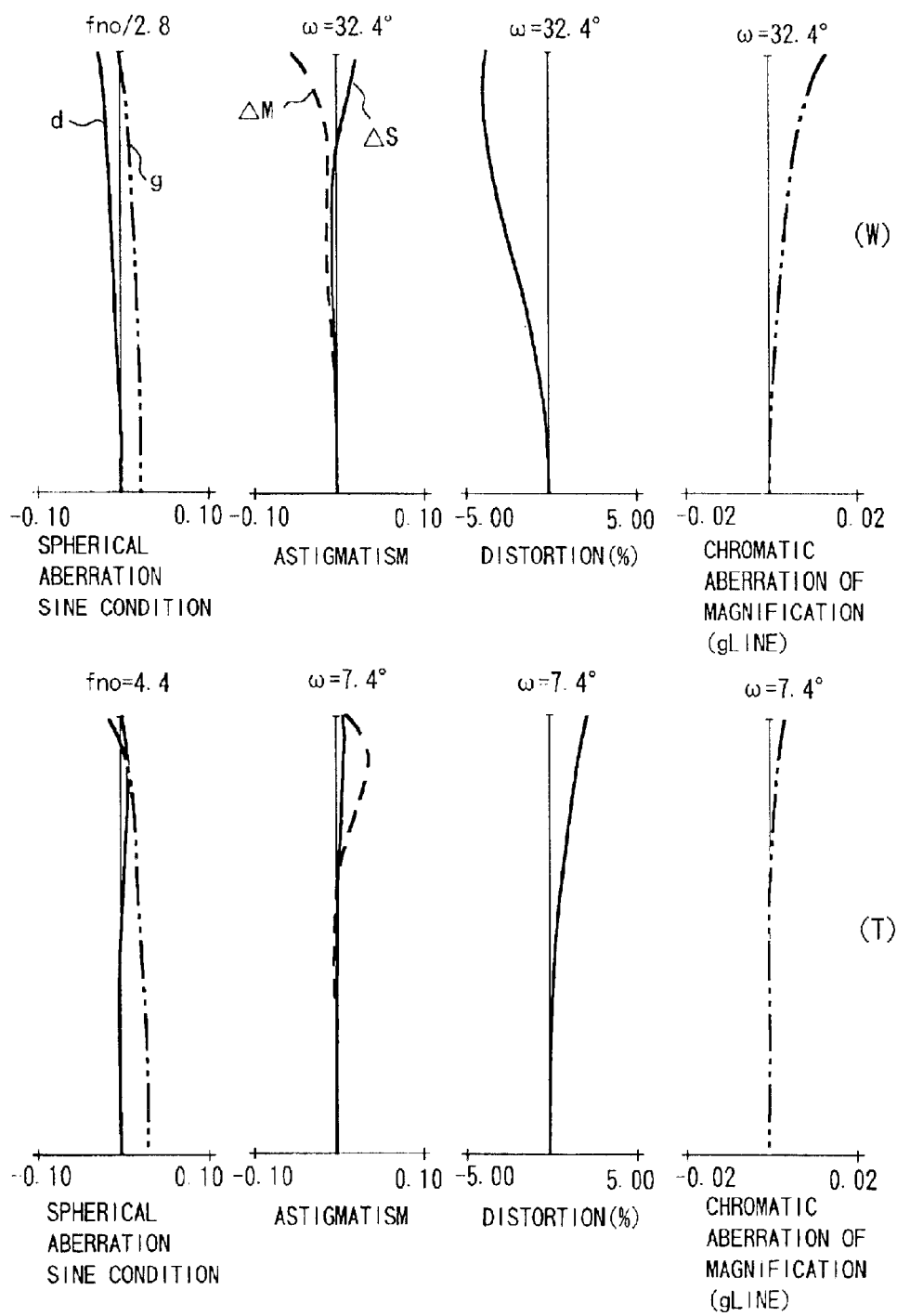
FIG. 6 shows various aberrations of the zoom lens of FIG. 5.

FIG. 2, FIG. 4 and FIG. 6 are diagrams of various aberrations of Numerical Examples 1–3 of the invention.

In the zoom lens of any of these embodiments, the whole lens system is configured of at least four lens units, and zooming is performed by varying the distances between each lens units on the optical axis.

In particular, a size reduction of the whole lens system is attempted by having the second lens unit B reverse its moving direction so as to draw a convex locus toward the image side and thereby making possible shortening of the spacing allowance between the second lens unit B and the third lens unit C. Since in this zoom type, the distance between the first lens unit A and the second lens unit B and that between the third lens unit C and the fourth lens unit D are minimized while that between the second lens unit B and the third lens unit C is maximized at the wide angle end, it is made possible to reduce the overall length of the camera when the zoom lens is housed in the camera body by adopting a mechanism to reduce the spacing between the second lens unit and the third lens unit (barrel collapsing mechanism), when the camera is not being used.

The fourth lens unit D has at least two positive and negative single lenses, and satisfies the condition of:

$$1 < vn - vp < 30 \quad (1)$$

where vn is the Abbe number of the negative lens and vp, the Abbe number of the positive lens of the fourth lens unit D.

Conditional Expression (1) concerns the choice of glass material for the fourth lens unit D. In a zoom lens having four lens units such as this embodiment, it is necessary to select an appropriate glass material for the fourth lens unit D to compensate for the chromatic aberration of magnification occurring by the high position of the incident light on the first lens unit A.

If the value of vn−vp exceeds the upper limit of Conditional Expression (1), since the burden of magnification varying load on the fourth lens unit D is limited in zooming from the wide angle end toward the telephoto end then, it will become difficult to adapt the focal length of the whole lens system to high magnification. Furthermore, where the fourth lens unit is used as a focusing unit, the variations of the aberration in focusing with variations in the distance to the subject become greater. If the value of vn−vp is lower than the lower limit of Conditional Expression (1), it will become difficult to compensate in the fourth lens unit D for the chromatic aberration of magnification arising in the first lens unit A.

The zoom lens of the embodiment also satisfies the condition of:

$$0.4 < (Cw - Ct)/(Aw - At) < 0.8 \quad (2)$$

where Cw is the distance between the third lens unit C and the fourth lens unit D on the optical axis at the wide angle end; Ct, that between the third lens unit C and the fourth lens unit D on the optical axis at the telephoto end; Aw, that between the first lens unit A and the second lens unit B on the optical axis at the wide angle end; and At, that between the first lens unit A and the second lens unit B on the optical axis at the telephoto end.

Conditional Expression (2) concerns the distance between the first lens unit A and the second lens unit B on the optical axis and that between the third lens unit C and the fourth lens unit D on the optical axis. Since no sufficient amount of movement can be allowed for the first lens unit A and the third lens unit C if either limit is exceeded, it will become difficult to obtain a desired ratio of magnification. This is an indispensable condition for reducing the distance between the first lens unit A and the second lens unit B on the optical axis and that between the third lens unit C and the fourth lens unit D on the wide angle end and thereby achieving a lens configuration suitable for a barrel collapsing mechanism.

In the embodiments, the fourth lens unit D, which is smaller and lighter than any other lens unit is provided with a focusing function. This arrangement can be expected to help reduce the size of the lens barrel structure.

Further, the first lens unit A and the second lens unit B draw convex loci toward the image side in zooming, respectively, while the third lens unit C moves monotonously toward the object. This serves to reduce the front lens diameter, shorten the overall length and suppress the variations of the aberration in the middle of the zooming range.

Further, by composing the fourth lens unit D, in the order from the object side, of a positive single lens in which both surfaces are convex and a negative single lens, astigmatisms and the curvature of field in the whole of the zooming range are suppressed.

Further, by cementing together the positive and negative single lenses of the fourth lens unit D as shown in FIGS. 1 and 5, it is made possible to provide a zoom lens in which performance deterioration due to manufacturing errors in the lenses and the lens holding barrel is suppressed.

Numerical Examples of the present invention will be shown below. In each Numerical Example, ri denotes the radius of curvature of the i-th surface counted from the object side; di, the thickness or air gap between the i-th surface and the i+1-th surface counted from the object side; ni and vi, the optical power and the Abbe number, respectively, of the material of the i-th optical member counted from the object side.

The aspheric shape is represented by:

$$X = \frac{(1+R)Y^2}{1+\sqrt{(1+(1+K)(Y/R)^2)}} + AY^2 + BY^4 + CY^6 + DY^8 + EY^{10}$$

where R denotes the radius of curvature at the center of the lens; the X axis, the direction of the optical axis (the traveling direction of light); the Y axis, the direction perpendicular to the optical axis; K, the conical coefficient; and A, B, C, D and E, aspheric coefficients. To add, "e −X" means "×10$^{-X}$".

Additionally, table 1 shows calculated results of Expressions (1) and (2) in Numerical Examples 1 to 3.

NUMERICAL EXAMPLE 1

| f = | 7.46779 | fno = 1: | 2.8 | 2ω = | 64.4 |
|---|---|---|---|---|---|
| | −36.55 | | −4.4 | | −14.7 |
| r1 = | 36.094 | d1 = 5.50 | | n1 = 1.51633 | v1 = 64.1 |
| r2 = | 817.637 | d2 = Variable | | | |
| r3 = | 47.412 | d3 = 1.30 | | n2 = 1.77250 | v2 = 49.6 |
| r4 = | 10.540 | d4 = 4.75 | | | |
| r5 = | −456.231 | d5 = 1.00 | | n3 = 1.69680 | v3 = 55.5 |
| r6 = | 18.620 | d6 = 1.70 | | | |
| r7 = | 16.979 | d7 = 2.80 | | n4 = 1.84666 | v4 = 23.9 |
| r8 = | 42.188 | d8 = Variable | | | |
| r9 = | (Aperture-Stop) | d9 = 2.30 | | | |
| r10 = | 9.872 | d10 = 2.80 | | n5 = 1.69350 | v5 = 53.2 |
| r11 = | 261.662 | d11 = 0.30 | | | |
| *r12 = | 9.952 | d12 = 2.40 | | n6 = 1.67790 | v6 = 55.3 |
| r13 = | 47.844 | d13 = 0.70 | | n7 = 1.84666 | v7 = 23.9 |
| r14 = | 6.525 | d14 = 1.00 | | | |
| r15 = | 76.609 | d15 = 1.40 | | n8 = 1.60311 | v8 = 60.7 |
| r16 = | 339.037 | d16 = Variable | | | |
| *r17 = | 24.494 | d17 = 4.40 | | n9 = 1.73077 | v9 = 40.5 |
| r18 = | −8.500 | d18 = 0.70 | | n10 = 1.58913 | v10 = 61.2 |
| r19 = | 51.339 | d19 = 2.00 | | | |
| r20 = | ∞ | d20 = 5.00 | | n11 = 1.51633 | v11 = 64.2 |
| r21 = | ∞ | | | | |

| Focal length Variable distance | 7.47 | 16.45 | 36.55 |
|---|---|---|---|
| d2 | 1.50 | 14.20 | 25.59 |
| d8 | 31.67 | 12.72 | 2.00 |
| d16 | 3.57 | 6.64 | 16.12 |

12th surface, aspheric surface

R = 9.95   K = −1.139   B = −1.491E−4   C = −5.809E−7
D = −6.438e−8

17th surface, aspheric surface

R = 24.94   K = −6.550   B = −1.737E−5   C = −5.658E−7
D = −4.446e−9

NUMERICAL EXAMPLE 2

| f = | 7.40000 | fno = 1: | 2.8 | 2ω = | 64.8 |
|---|---|---|---|---|---|
| | −40.0 | | −4.4 | | −13.4 |
| r1 = | 33.707 | d1 = 5.50 | | n1 = 1.51633 | v1 = 64.2 |
| r2 = | 824.102 | d2 = Variable | | | |
| r3 = | 46.742 | d3 = 1.30 | | n2 = 1.77250 | v2 = 49.6 |
| r4 = | 10.028 | d4 = 4.70 | | | |
| r5 = | −830.878 | d5 = 1.00 | | n3 = 1.77250 | v3 = 49.6 |
| r6 = | 15.799 | d6 = 1.70 | | | |
| r7 = | 15.841 | d7 = 2.80 | | n4 = 1.84666 | v4 = 23.9 |
| r8 = | 44.843 | d8 = Variable | | | |
| r9 = | (Aperture-Stop) | d9 = 2.30 | | | |
| *r10 = | 9.558 | d10 = 2.80 | | n5 = 1.69350 | v5 = 53.2 |
| r11 = | −401.969 | d11 = 0.30 | | | |
| r12 = | 11.155 | d12 = 2.40 | | n6 = 1.69680 | v6 = 55.5 |
| r13 = | 35.781 | d13 = 0.70 | | n7 = 1.84666 | v7 = 23.9 |
| r14 = | 6.325 | d14 = 2.00 | | | |
| r15 = | 264.512 | d15 = 1.40 | | n8 = 1.69680 | v8 = 55.5 |
| r16 = | −58.865 | d16 = Variable | | | |
| r17 = | 18.437 | d17 = 3.00 | | n9 = 1.74950 | v9 = 35.3 |
| r18 = | −30.233 | d18 = 1.00 | | | |
| r19 = | −21.125 | d19 = 1.00 | | n10 = 1.65160 | v10 = 58.5 |
| r20 = | 47.118 | d20 = 2.00 | | | |
| r21 = | ∞ | d21 = 5.00 | | n11 = 1.51633 | v11 = 64.2 |
| r22 = | ∞ | | | | |

| Focal length Variable distance | 7.40 | 17.17 | 40.00 |
|---|---|---|---|
| d2 | 2.00 | 10.44 | 23.62 |
| d8 | 27.76 | 9.04 | 1.54 |
| d16 | 2.97 | 6.31 | 19.35 |

10th surface, aspheric surface

R = 9.558   K = −2.306   B = 2.199E−4   C = −1.441E−6
D = −6.438e−8   E = −6.220e−12

NUMERICAL EXAMPLE 3

| f = | 7.40000 | fno = 1: | 2.8 | 2ω = | 64.8 |
|---|---|---|---|---|---|
| | −36.29 | | −4.4 | | −13.4 |
| r1 = | 33.481 | d1 = 5.50 | | n1 = 1.49700 | v1 = 81.6 |
| r2 = | −1268.702 | d2 = Variable | | | |
| r3 = | 55.862 | d3 = 1.60 | | n2 = 1.77250 | v2 = 49.6 |
| r4 = | 10.582 | d4 = 5.33 | | | |
| r5 = | −276.434 | d5 = 1.20 | | n3 = 1.69680 | v3 = 55.5 |
| r6 = | 19.452 | d6 = 1.60 | | | |
| r7 = | 17.720 | d7 = 2.80 | | n4 = 1.84666 | v4 = 23.9 |
| r8 = | 46.198 | d8 = Variable | | | |
| r9 = | (Aperture-Stop) | d9 = 0.80 | | | |
| *r10 = | 10.413 | d10 = 2.80 | | n5 = 1.74330 | v5 = 49.3 |
| r11 = | −168.016 | d11 = 0.30 | | | |
| r12 = | 10.492 | d12 = 2.40 | | n6 = 1.69680 | v6 = 55.5 |
| r13 = | 41.248 | d13 = 0.70 | | n7 = 1.84666 | v7 = 23.9 |
| n14 = | 6.205 | d14 = Variable | | | |
| *r15 = | 18.355 | d15 = 4.00 | | n8 = 1.80400 | v8 = 46.6 |
| r16 = | −8.717 | d16 = 0.80 | | n9 = 1.72000 | v9 = 50.3 |
| r17 = | 65.611 | d17 = 2.00 | | | |
| r18 = | ∞ | d18 = 5.00 | | n10 = 1.51633 | v10 = 64.2 |
| r19 = | ∞ | | | | |

| Focal length Variable distance | 7.40 | 16.39 | 36.29 |
|---|---|---|---|
| d2 | 1.00 | 12.01 | 22.25 |
| d8 | 30.10 | 11.91 | 2.00 |
| d16 | 5.72 | 9.62 | 21.10 |

10th surface, aspheric surface

R = 10.413   K = −8.625E−1  B = 8.510E−6   C = −2.182E−7
D = 6.271e−9

-continued

NUMERICAL EXAMPLE 3

15th surface, aspheric surface

R = 18.355　　K = −3.600　　B = 2.922E−5　　C = −4.457E−7
D = −3.920e−9

TABLE 1

|  | Numerical Example 1 | Numerical Example 2 | Numerical Example 3 |
|---|---|---|---|
| Conditional Expression (1) | 20.7 | 23.2 | 3.7 |
| Conditional Expression (2) | 0.51 | 0.76 | 0.72 |

As described above, it is possible to realize a zoom lens having a satisfactory level of optical performance in any zooming position in its zooming range of about fivefold in magnification ratio by configuring, in a zoom comprising four lens units, the fourth lens unit of two or more positive and negative single lenses and selecting the glass material of each lens appropriately.

Next will be described an embodiment of image pickup apparatus (digital still camera) provided with the above-described zoom lens with reference to FIGS. 7(A) and 7(B).

Figure 7:
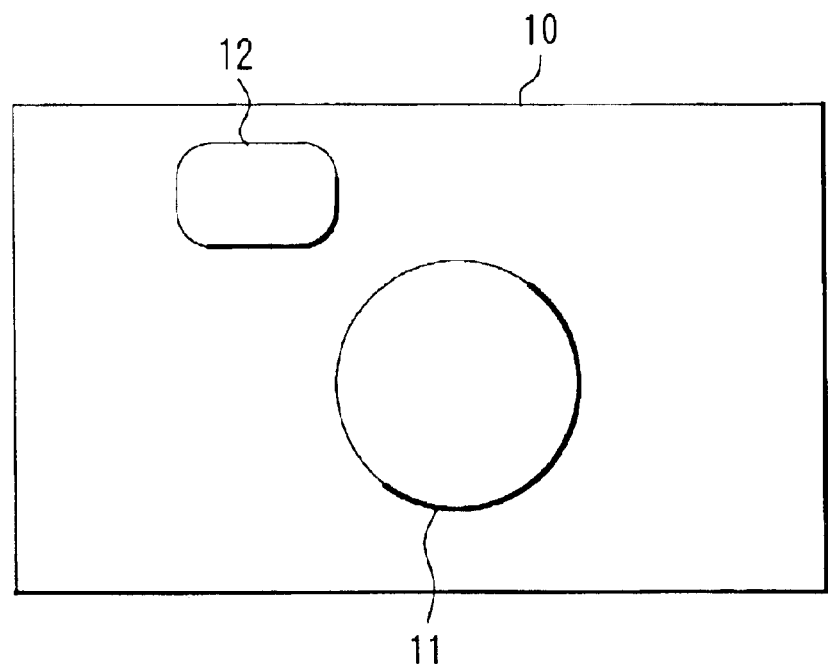
FIG. 7 are schematic diagrams of a digital still camera.
Figure 7:
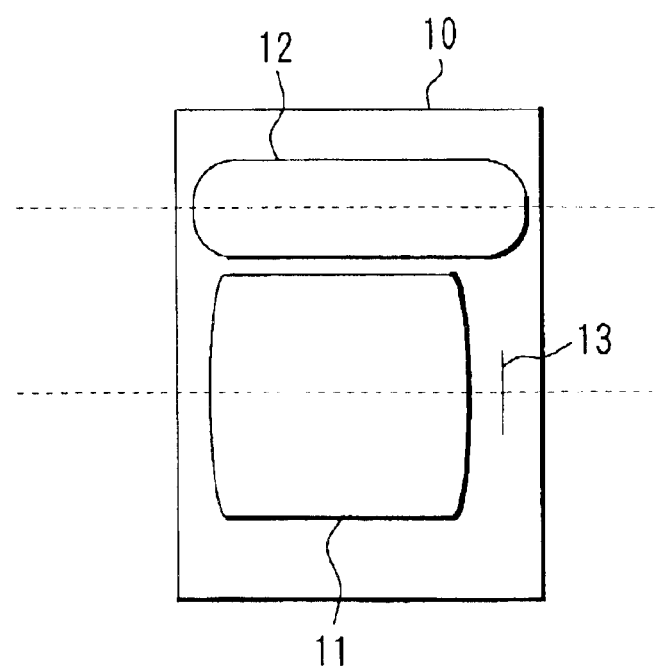

FIG. 7(A) shows a front view, and FIG. 7(B), a sectional profile, of the digital still camera. In the drawings, reference numeral 10 denotes the camera body (box); 11, an image pickup optical system using a zoom lens of one of Numerical Examples 1–3; 12, a view finder optical system; and 13, a solid image pickup element (photoelectric conversion element) such as CCD, CMOS sensor or the like. The solid pickup element 13 receives an image of the subject formed in the image pickup optical system 11, and converts it into electrical information. The visual information of the subject converted into electrical information is recorded in a memory not shown.

By applying the zoom lens of this embodiment to the image pickup optical system of the digital still camera, a compact image pickup apparatus can be realized.

While preferred embodiments have been described, it is to be understood that modification and variation of the present invention may be made without departing from the sprit or scope of the following claims.

What is claimed is:

1. A zoom lens, comprising, in the order from an object side toward an image side:

a first lens unit having positive optical power;

a second lens unit having negative optical power;

a third lens unit having positive optical power; and a fourth lens unit having positive optical power, said fourth lens unit moving for zooming, and having at least two lens elements including positive and negative lens elements;

wherein said zoom lens performs zooming by varying the distances between each lens units and the fourth lens unit consists of lens elements which satisfy the following conditional expression:

$$1 < \nu n - \nu p < 30$$

where νn is the Abbe number of any negative lens element of said fourth lens unit, and νp is the Abbe number of any positive lens element of said fourth lens unit.

2. The zoom lens, according to claim 1, further satisfying the following conditional expression:

$$0.4 < (Cw-Ct)/(Aw-At) < 0.8$$

wherein Cw is the distance between said third lens unit and said fourth lens unit on the optical axis at the wide angle end;

Ct is the distance between said third lens unit and said fourth lens unit on the optical axis at the telephoto end;

Aw is the distance between said first lens unit and said second lens unit on the optical axis at the wide angle end; and At is the distance between said first lens unit and said second lens unit on the optical axis at the telephoto end.

3. The zoom lens, according to claim 1, wherein:

said fourth lens unit moves for focusing.

4. The zoom lens, according to claim 1, wherein:

in zooming from the wide angle end toward the telephoto end, said first lens unit and said second lens unit move in convex loci toward the image side, respectively, and said third lens unit moves monotonously toward the object.

5. The zoom lens, according to claim 1, wherein:

said fourth lens unit consists of, in the order from the object side toward the image side, a positive lens element whose both surfaces are convex and a negative lens element.

6. The zoom lens, according to claim 1, wherein:

said fourth lens unit consists of a cemented lens formed by cementing together said positive lens element and said negative lens element.

7. The zoom lens, according to claim 1, wherein:

said zoom lens forms an image on a photoelectric conversion element.

8. An image pickup apparatus comprising:

the zoom lens according to claim 1, and a photoelectric conversion element for optically receiving an image formed by said zoom lens.

* * * * *